(12) United States Patent
Beller

(10) Patent No.: US 7,317,518 B2
(45) Date of Patent: Jan. 8, 2008

(54) DETERMINATION OF AN OPTICAL PROPERTY OF A DUT BY OTDR MEASUREMENT

(75) Inventor: Josef Beller, Tuebingen (DE)

(73) Assignee: Agilent Technologies Inc., Palo Alto, CA (US)

( * ) Notice: Subject to any disclaimer, the term of this patent is extended or adjusted under 35 U.S.C. 154(b) by 0 days.

(21) Appl. No.: 11/488,717

(22) Filed: Jul. 18, 2006

(65) Prior Publication Data

US 2006/0256319 A1    Nov. 16, 2006

(30) Foreign Application Priority Data

Jul. 21, 2004    (WO) ............... PCT/EP04/50032

(51) Int. Cl.
*G01N 21/00* (2006.01)
(52) U.S. Cl. .................................. 356/73.1
(58) Field of Classification Search ............ None
See application file for complete search history.

(56) References Cited

U.S. PATENT DOCUMENTS

| 4,497,575 A | 2/1985 | Philipp |
| 6,708,004 B1* | 3/2004 | Homsey ............ 398/177 |
| 7,016,024 B2* | 3/2006 | Bridge et al. ........ 356/73.1 |

OTHER PUBLICATIONS

Accurate Reflectance and Optical Fibre Backscatter Parameter Measurements Using an OTDR, Dec. 6, 1990, Stevenage, Herts., GB.

\* cited by examiner

*Primary Examiner*—Tu T Nguyen

(57) ABSTRACT

The present invention relates to an apparatus and to a method of determination of an optical property of a DUT, in particular of an optical fiber, by means of OTDR, comprising the steps of: coupling an initial optical signal into the DUT, detecting a response signal of the DUT, and determining the optical property of the DUT by means of OTDR using at least a second order backscatter part of the response signal.

13 Claims, 4 Drawing Sheets

DETERMINATION OF AN OPTICAL PROPERTY OF A DUT BY OTDR MEASUREMENT

This application is the National Stage of International Application No. PCT/EP2004/050032, filed on 21 Jul. 2004.

BACKGROUND OF THE INVENTION

The present invention relates to determination of an optical property of a device under test (DUT), e.g. an optical fiber, by means of Optical Time Domain Reflectometry (OTDR) measurement.

OTDR and respective devices are common and indispensable tools for optical fiber network installers to perform optical characteristics measurements. Installation and commissioning of optical fiber links in optical fiber networks normally require the test of the fiber for loss. However, not only link- and splice-loss, but most often (especially in video and high data rate optical fiber systems) also return-loss and reflectance of the optical fiber. The latter is a characteristic figure for reflection that generally can be determined by an OTDR only if the backscatter factor of the fiber under test is known.

An OTDR usually probes the fiber under test with a short laser pulse and displays the fiber's response as a power vs. distance graph. A detailed technical description about the state of the art of OTDR measurements is given by Dennis Derickson in "Fiber Optic Test and Measurement Handbook, Chapter 11, by Prentice-Hall Inc., Upper Saddle River, N.J. 07458, USA, 1998".

As splice-loss and fiber attenuation measurements are relative power measurements, no further information about the fiber under test is needed. Only for accurate distance measurements the exact refractive index of the optical fiber under test must be known. On the other hand, the determination of the strength of a reflection requires the correct backscatter factor of the fiber. However, this figure is rarely known, because it varies with wavelength of the probing signal and with fiber type. Therefore, in prior art OTDRs typical default values are used as replacements for the real backscatter factor, which makes such OTDR based determinations of the strength of a reflection not very reliable.

Even with sophisticated laboratory-type test equipment it is not straightforward to determine the backscatter factor of an optical fiber. Besides that, also in a laboratory, a very careful and methodical working style is mandatory for accurate results. Such a working style can not be performed outside the laboratory. To date there is no proven and reliable technique for measuring the backscatter factor outside the laboratory, e.g. in the field.

SUMMARY OF THE INVENTION

It is an object of the invention to provide improved determination of an optical property of a DUT by means of OTDR.

The object is solved by the independent claims.

The present invention describes a measurement technique, which is applicable in the laboratory and in the field, i.e., outside the laboratory, as well. With only an OTDR measurement and a simple calculation, or alternatively with the help of a graphical chart, the backscatter factor of an optical fiber under test can easily be determined.

The backscatter factor S is very important because the reflectance r of a reflective device (e.g. a fiber end, an optical connector or a mechanical splice) depends directly on the accuracy of the backscatter factor S according to the following formula:

$$r = -S + 10 \log(pw) + 10 \log(10^{0.2\delta} - 1) \quad (1)$$

with r [dB] being the reflectance of the reflective device, δ [dB] being the reflection height of the detected response signal, S [dB/μs] being the backscatter factor of the DUT and pw [μs] being the pulse width of the initial optical signal.

S on the other hand depends on the type of the optical fiber and on the wavelength of the probe pulse. Typical figures for S can be found in the range of 45 dB/μs to 54 dB/μs for commonly used single mode fibers.

Thus not knowing the exact backscatter factor S of a fiber under test can lead to wrong results of reflectance r with up to 9 dB deviation.

In practical industrial acceptance tests, exceeding a threshold of the reflectance r by only one tenth of a dB could lead to a rejection of such a fiber link. Clearly there is the above-mentioned need for an easy and robust method to determine the backscatter factor of an optical fiber.

The present invention comprises the idea of solving equation (1) for the backscatter factor S. This yields the following equation (2):

$$S = -r + 10 \log(pw) + 10 \log(10^{0.2\delta} - 1) \quad (2)$$

Therefore, if a reference reflector with a calibrated reflectance r would be at hand, an OTDR measurement would supply the reflection height δ, needed to calculate the backscatter factor S. However, using an accurate reference reflector is not feasible in practice.

The new approach according to the present invention does not need any additional devices (reference reflector with a calibrated reflectance r). In order to determine an accurate value for the reflectance r, the present invention uses an effect described in "Josef Beller, Reducing Backscatter Echoes in OTDR Measurements, Hewlett Packard Company 1998.

This effect is as follows: The stimulus signal of an OTDR measurement can generate backscatter echoes when being reflected somewhere in the fiber under test. Whereas reflection echoes are well known, backscatter echoes are rather unheard of in the prior art. This is because such echo signals are very small, often covered by noise, and often interpreted as an erroneous behavior of the OTDR measurement devices.

The simplest case to derive a basic understanding about this matter is to look at a reflection at the end of the fiber under test. Assuming an open straight connector at the end of the fiber under test, the connector has a reflectance of about −14 dB. When the probing pulse reaches the connector at the fiber end it is mirrored towards the OTDR and travels in this new direction with an amplitude lowered by 14 dB. This smaller pulse generates also a backscatter signal, which moves in the opposite direction towards the fiber end, where it redirects its sense of propagation, with 14 dB reduction in signal level as well. In this context it is only important, that this additional backscatter signal of $2^{nd}$ order shows up on the OTDR display as an exact copy of the original fiber trace, however, on a 14 dB lower signal level, and as seen from the fiber end (see also FIG. 3 and the respective description).

According to the invention at least one optical property of the DUT using OTDR using is determined by at least using a second order backscatter part of the response signal.

Preferably, for determining the reflectance r of the DUT by means of an OTDR, a first power level of a first order backscatter part of the response signal and a second power level of the second order backscatter part of the response signal is used. The return or insertion loss IL (=-reflectance r) between $1^{st}$ and $2^{nd}$ order backscatter is an exact measure for the return-loss of the end reflection.

Taking into account that the vertical axis of a screen of an OTDR measurement device is scaled logarithmically (e.g. as 5*log (power), the return loss IL can by directly taken from the OTDR display.

Therefore, according to the invention it is now possible to calculate the backscatter factor S from equation (2), as now the reflection height $\delta$, the pulse width pw, and the reflectance r(=-insertion loss IL) are known.

In another embodiment of the present invention the inventive method comprises the steps of matching a first two least square approximation (LSA) line to a first power level trace in an OTDR signal power vs. distance graph of a first power level of a first order backscatter part of the response signal, matching a second LSA line to a second power level trace in a OTDR signal power vs. distance graph of a second power level of the second order backscatter part of the response signal, and determining the difference between the first LSA line and the second LSA line to determine the reflectance r of the DUT.

Another example of performing the inventive concept is to follow the steps of determining the highest point in a first power level trace in an OTDR signal power vs. distance graph of a first power level of a first order backscatter part of the response signal, determining the lowest point in a first power level trace in an OTDR signal power vs. distance graph of a first power level of a first order backscatter part of the response signal, determining the lowest point in a second power level trace in a OTDR signal power vs. distance graph of a second power level of the second order backscatter part of the response signal, determining a first difference between the highest point and the lowest point in the first order power level trace, determining a second difference between the lowest point in the first power level trace and the lowest point in the second power level trace, and subtracting the first difference from the second difference to determine the reflectance r of the DUT.

Other preferred embodiments are shown by the dependent claims.

The invention can be partly embodied or supported by one or more suitable software programs, which can be stored on or otherwise provided by any kind of data carrier, and which might be executed in or by any suitable data processing unit. Software programs or routines are preferably applied to the realization of the inventive method.

BRIEF DESCRIPTION OF THE DRAWINGS

Other objects and many of the attendant advantages of the present invention will be readily appreciated and become better understood by reference to the following detailed description when considering in connection with the accompanied drawings. The components in the drawings are not necessarily to scale, emphasis instead being placed upon clearly illustrating the principles of the present invention. Features that are substantially or functionally equal or similar will be referred to with the same reference sign(s).

DETAILED DESCRIPTION OF PREFERRED EMBODIMENTS OF THE INVENTION

Figure 1:
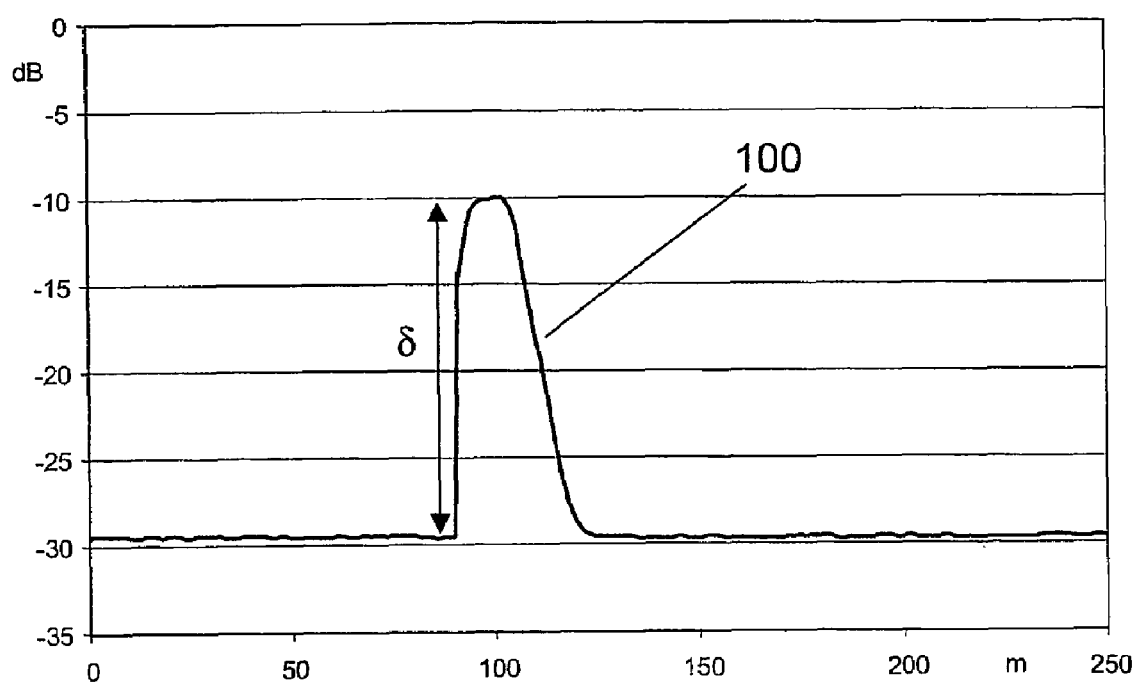
FIG. 1 shows a graph with a reflective event in an OTDR measurement of a fiber under test according to an embodiment of the present invention.

Referring now in greater detail to the drawings, FIG. 1 shows a graph or trace of a reflective event 100 in an OTDR measurement of a (not shown) fiber under test according to an embodiment of the present invention. The height of the reflective event is $\delta$. With such a measurement result the reflectance r of the fiber under test can be calculated according to the following equation (1), which is derived e.g. in Dennis Derickson in "Fiber Optic Test and Measurement Handbook, Chapter 11, by Prentice-Hall Inc., Upper Saddle River, N.J. 07458, USA, 1998". The reflectance r [dB] is a function of the reflection height $\delta$ [dB], the fiber's backscatter factor S [dB/µs] and the pulse width pw [µs] and is given as the following equation (1):

$$r = -S + 10 \log(pw) + 10 \log(10^{0.2\delta} - 1) \quad (1)$$

Then the backscatter factor S of the DUT can be determined by using the reflectance r of the DUT and the following equation:

$$S = -r + 10 \log(pw) + 10 \log(10^{0.2\delta} - 1) \quad (2)$$

Figure 2:
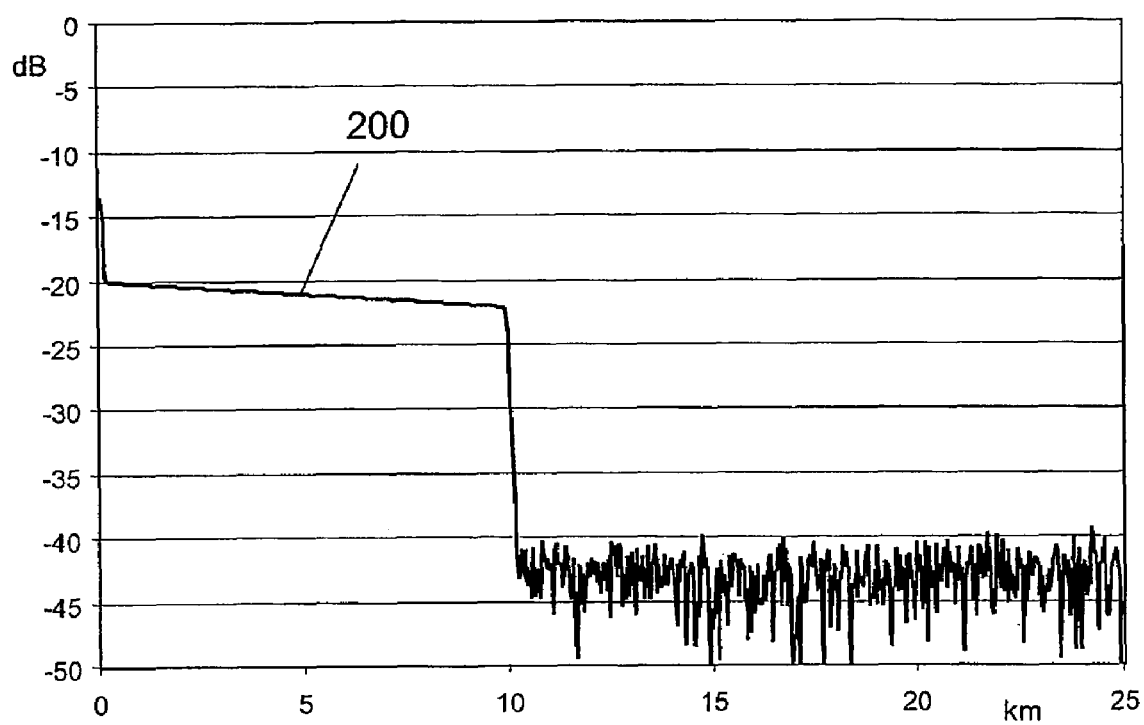
FIG. 2 shows a graph of a $1^{st}$ order backscatter trace of a fiber under test without an end reflection derived from an OTDR measurement according to an embodiment of the present invention.
Figure 3:
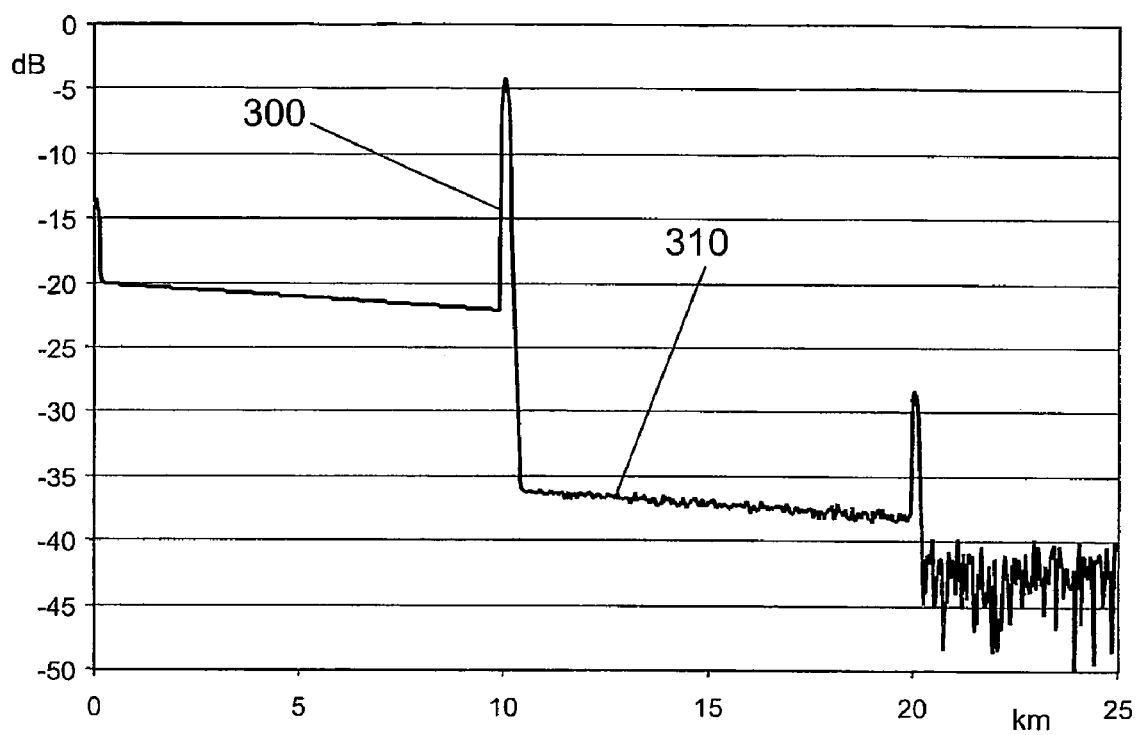
FIG. 3 shows a graph of a $2^{nd}$ order backscatter trace of a fiber under test with an end reflection derived from an OTDR measurement according to an embodiment of the present invention.

To further support the understanding of the present invention, FIG. 2 shows a graph of a $1^{st}$ order backscatter trace 200 of a fiber under test without an end reflection derived from an OTDR measurement according to an embodiment of the present invention and FIG. 3 shows a graph of a $2^{nd}$ order backscatter trace 310 of a fiber under test with an end reflection 300 derived from an OTDR measurement according to another embodiment of the present invention.

According to FIG. 2 the backscatter trace 200 ends after the fiber end at about 10 km fiber length with an immediate drop of the backscatter signal to a noise level. This is the expected pattern of a normal optical fiber without end reflection.

In FIG. 3 a clear end reflection 300 is visible, causing a backscatter echo signal 310 to appear in the graph on the right hand side of the end reflection 300, and to continue for another length of the fiber.

When looking at FIG. 3, the finite width and the falling slope of the end reflection 300 poses the question of how to measure the insertion loss IL under such circumstances.

Figure 4:
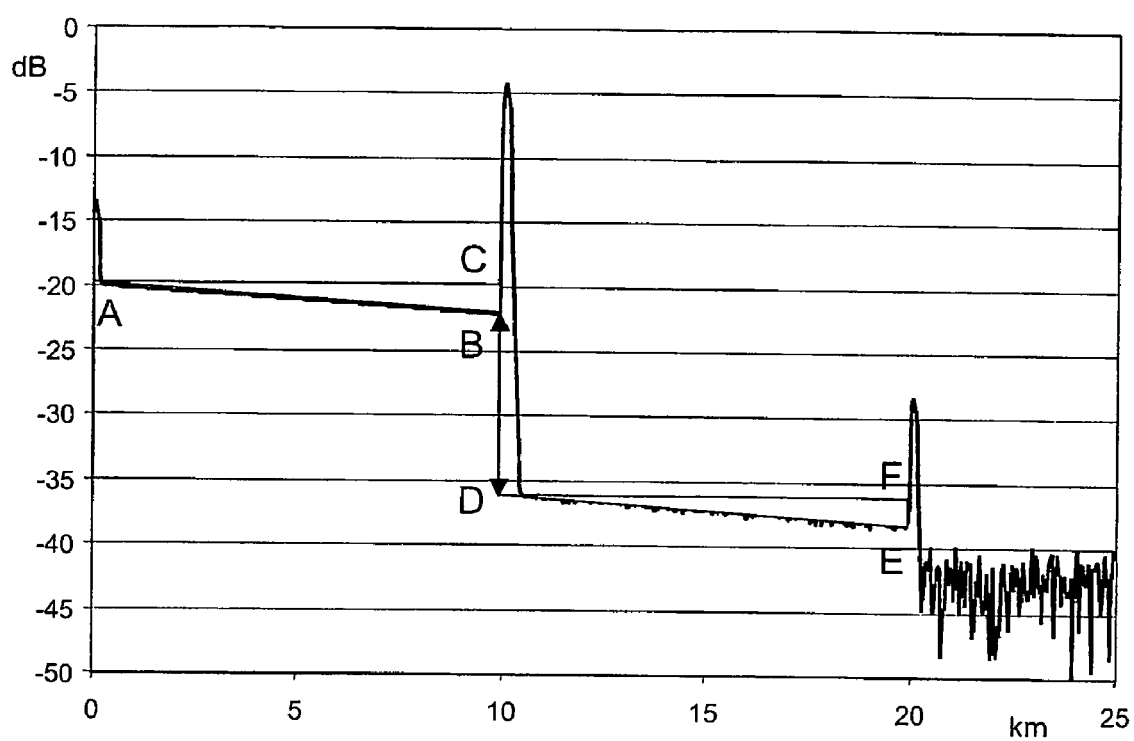
FIG. 4 shows the graph of FIG. 3 with an illustration of an extraction of critical parameters from the OTDR measurement result according to an embodiment of the present invention.

To solve this problem FIG. 4 shows the graph of FIG. 3 with an illustration of an extraction of critical parameters from the OTDR measurement result according to an embodiment of the present invention. This approach for measurements of the insertion loss IL uses LSA lines A-B and D-E that are matched to the backscatter curves of $1^{st}$ and $2^{nd}$ order. Having done this, it is easy to measure the vertical offset D-B between these two lines A-B and D-E. It is clear that the second LSA line D-E has to be fitted to the rear part 310 of the trace. This, however, usually gives reasonable results only, if the slope there is not biased by the receiver's non-linearity.

Another inventive solution is to first determine the total loss of the fiber under test, which is given by the vertical line B-C of the triangle ABC. This is possible because points A and B can be measured. D is normally difficult to measure because the drop of the signal at the end of the fiber at about 10 km is not always as sharp as shown in FIG. 3. However, E can be determined and B-C=E-F. Therefore, in a second step the insertion loss IL=D-B can be determined by subtracting the length E-F=B-C from the vertical difference between points B and E.

Alternatively, according to an embodiment of the invention a copy of triangle ABC is anchored at point E, in which case the insertion loss IL is given by the length D-B. This approach is not as susceptible to the dynamic signal distortion of the receiver as the LSA approach.

The invention claimed is:

1. A method of determining an optical property of a Device Under Test—DUT, in particular of an optical fiber, by means of Optical Time Domain Reflectometry—OTDR, comprising the steps of:
    coupling an initial optical signal into a first end of the DUT,
    detecting a response signal of the DUT, and
    determining the optical property of the DUT by means of OTDR using at least a second order backscatter part of the response signal originating from a backwards traveling part of the initial optical signal reflected somewhere in the DUT, wherein the second order backscatter part moves in an opposite direction towards a second end of the DUT and redirects its sense of propagation to travel back to the first end of the DUT.

2. The method of claim 1, further comprising:
    using a first order backscatter part of the response signal and the second order backscatter part of the response signal to determine the optical property of the DUT by means of OTDR.

3. The method of claim 2, wherein the reflectance of the DUT is determined as a function of the first order backscatter part of the response signal and the second order backscatter part of the response signal.

4. The method of claim 3, wherein the reflectance is determined by:
    matching a first least square approximation—LSA— line to a first power level trace in an OTDR signal power vs. distance graph of a first power level of a first order backscatter part of the response signal,
    matching a second LSA line to a second power level trace in a OTDR signal power vs. distance graph of a second power level of the second order backscatter part of the response signal, and
    determining the difference between the first LSA line and the second LSA line to determine the reflectance of the DUT.

5. The method of claim 3, wherein the reflectance is determined by:
    determining the highest point in a first power level trace in an OTDR signal power vs. distance graph of a first power level of a first order backscatter part of the response signal,
    determining the lowest point in a first power level trace in an OTDR signal power vs. distance graph of a first power level of a first order backscatter part of the response signal,
    determining the lowest point in a second power level trace in a OTDR signal power vs. distance graph of a second power level of the second order backscatter part of the response signal, and
    determining a first difference between the highest point and the lowest point in the first order power level trace
    determining a second difference between the lowest point in the first power level trace and the lowest point in the second power level trace, and
    subtracting the first difference from the second difference to determine the reflectance of the DUT.

6. The method of claim 3, further comprising:
    determining the backscatter factor of the DUT as a function of the reflectance of the DUT, the reflection height of the detected response signal, and the pulse width of the initial optical signal.

7. The method of claim 6, wherein the backscatter factor of the DUT by using the reflectance of the DUT is determined by the following equation:

$$S = -r + 10\log(pw) + 10\log(10^{0.2\delta} - 1)$$

with r [dB] being the reflectance of the DUT in decibel—dB—, δ[dB] being the reflection height of the detected response signal in dB, S [dB/µs] being the backscatter factor of the DUT in dB per microsecond—µs—, and pw [µs] being the pulse width of the initial optical signal in µs.

8. A software program or product, encoded on a computer readable medium, for executing the method of claim 1 when run on a data processing system.

9. An apparatus for determination of an optical property of a DUT by means of OTDR, comprising:
    a coupler for coupling an initial optical signal into a first end of the DUT,
    a detector for detecting a response signal of the DUT, and
    an OTDR measurement device for determining the optical property of the DUT by means of OTDR using at least a second order backscatter part of the response signal originating from a backwards traveling part of the initial optical signal reflected somewhere in the DUT, wherein the second order backscatter part moves in an opposite direction towards a second end of the DUT and redirects its sense of propagation to travel back to the first end of the DUT.

10. The apparatus of claim 9, further comprising:
    an evaluation unit comprising a computer, designed for:
    using a first power level of a first order backscatter part of the response signal and a second power level of the second order backscatter part of the response signal to determine the optical property of the DUT by means of OTDR.

11. The apparatus of claim 9, further comprising:
    an evaluation unit comprising a computer, designed for:
    matching a first LSA line to a first power level trace in an OTDR signal power vs. distance graph of a first power level of a first order backscatter part of the response signal,
    matching a second LSA line to a second power level trace in a OTDR signal power vs. distance graph of a second power level of the second order backscatter part of the response signal, and
    determining the difference between the first LSA line and the second LSA line to determine the reflectance of the DUT.

12. The apparatus of claim 9, further comprising:
    an evaluation unit, preferably comprising a computer, designed for:
    determining the highest point in a first power level trace in an OTDR signal power vs. distance graph of a first power level of a first order backscatter part of the response signal, determining the lowest point in a first power level trace in an OTDR signal power vs. distance graph of a first power level of a first order backscatter part of the response signal, determining the lowest point in a second power level trace in a OTDR signal power vs. distance graph of a second power level of the second order backscatter part of the response signal, determining a first difference between the highest point and the lowest point in the first order power level trace, determining a second difference between the lowest point in the first power level trace and the lowest point in the second power level trace, subtracting the first difference from the second difference to determine the reflectance of the DUT, and determining the backscatter factor of the DUT as a function of the reflectance of the DUT, the reflection height ($\delta$) of the detected response signal, and the pulse width of the initial optical signal.

13. The apparatus of claim 12, wherein the backscatter factor of the DUT is determined by using the following equation:

$$S = -r + 10\log(pw) + 10\log(10^{0.2\delta} - 1)$$

with r [dB] being the reflectance of the DUT, $\delta$ [dB] being the reflection height of the detected response signal, S [dB/µs] being the backscatter factor of the DUT and pw [µs] being the pulse width of the initial optical signal.

* * * * *